CABLE TERMINATION AMPLIFIER HAVING A NEGATIVE FEEDBACK CIRCUIT PROVIDING HIGH FREQUENCY CABLE TERMINATION IMPEDANCE
Filed Feb. 24, 1966
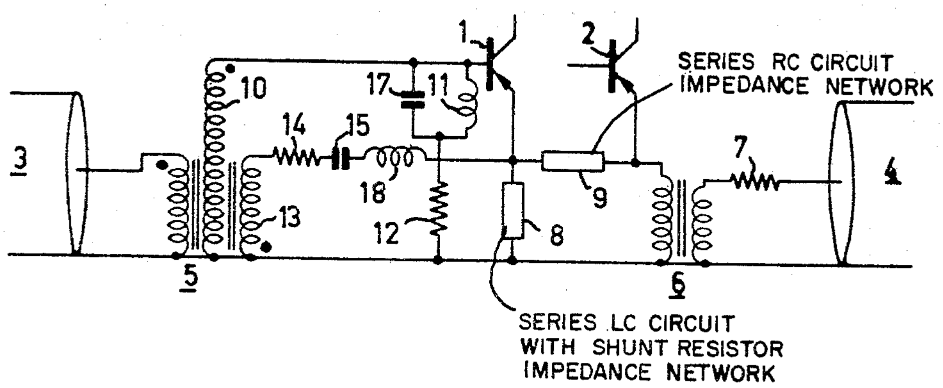
INVENTOR.
WILLEM VAN DOORN
BY
Frank R. Trifari
AGENT United States Patent Office 3,435,361
Patented Mar. 25, 1969

3,435,361

CABLE TERMINATION AMPLIFIER HAVING A NEGATIVE FEEDBACK CIRCUIT PROVIDING HIGH FREQUENCY CABLE TERMINATION IMPEDANCE

Willem van Doorn, Hilversum, Netherlands, assignor to North American Philips Company, Inc., New York, N.Y., a corporation of Delaware Filed Feb. 24, 1966, Ser. No. 529,809
Claims priority, application Netherlands, Mar. 20, 1965, 6503572
Int. Cl. H03f 1/08, 1/34
U.S. Cl. 330—28 4 Claims

ABSTRACT OF THE DISCLOSURE

A circuit for connecting an amplifier to a cable to provide proper termination impedance with a minimum of resistor produced noise. The amplifier input circuit includes a shunt resistor-inductor branch which provides the cable termination at low frequencies, but the inductor isolates the resistor at high frequencies. A negative feedback circuit is transformer coupled to the input circuit and includes a resistor-capacitor circuit, so that the resistor of the feedback circuit provides proper cable termination at high frequencies. The turns ratio of the transformer permits the resistor of the feedback circuit to be low, to minimize noise.

The invention relates to an amplifier, more particularly for telephone purposes, in which the input signal is supplied through an input transformer to the control electrode of an input amplifier element, while a frequency-dependent negative feedback oscillation is supplied to its main electrode which is common to the input circuit and the output circuit of this element. This frequency-dependent negative feedback renders it possible to equalize the frequency-dependent cable attenuation of a cable connected to the input or to the output of the amplifier, that is to say that the overall amplification characterisic curve of the amplifier inclusive of the cables has a flat—and hence a frequency-independent—course.

In order to obtain an amplifier having optimum noise properties, it is of importance that the required frequency-dependence of the characteristic curve should be achieved as far as possible by means of frequency-dependent negative feedback and as little as possible by the use of pre-equalization networks, since in the latter case a higher noise value is measured.

In a known multistage amplifier equipped with transistors, the emitter circuit of the first transistor includes a frequency-dependent network to which a negative feedback voltage is supplied so that signal distortion is suppressed but that nevertheless the amplifier exhibits the frequency-dependence required for equalization. In order to realize the desired cable terminal, a resistor should be connected in the base circuit of the transistor (i.e. in parallel with a winding of the input transformer connected to this base) so that a reflection-free termination of the cable is obtained. However, this resistor then contributes to the noise.

An improvement can be obtained when the input transformer is provided with a greater number of windings one of which is connected through a resistor to the frequency-dependent impedance in the emitter circuit of the first transistor; when this latter winding is provided with a smaller number of turns than that of the winding connected with the base of the transistor, the latter resistor can also be chosen smaller than the resistor mentioned in the preceding paragraph for obtaining the desired cable terminal. This resistor connected with the emitter impedance is the cause, however, of the amplification no longer decreasing sufficiently towards lower frequencies so that the use of pre-equalization networks is again compulsory.

The invention is characterized in that the winding of the input transformer connected with the control electrode is shunted by the series-combination of at least one inductor and a first resistor, while furthermore a lower signal voltage is derived from the input transformer, which voltage is supplied through the series-combination of at least a second resistor and a capacitor to the said main electrode of the input amplifier element.

According to the invention, it is particularly advantageous to use transistors, although in principle use may also be made of tube amplifiers. Apart from junction transistors, which are concerned hereinafter, it is also possible to use, for example, field effect transistors.

The invention will now be described more fully with reference to the drawing, which shows an embodiment of the invention.

The drawing shows a multistage transistor amplifier of which only the first transistor 1 and the last transistor 2 are represented. The amplifier is included between an input cable 3 and an output cable 4 and connected to these cables through a input transformer 5 and an output transformer 6, respectively. The desired output adaptation is obtained by means of a resistor 7. The desired equalization characteristic curve is produced with the aid of an impedance 8 which has the required frequency characteristic curve and which is connected in the emitter circuit of the transistor 1. Current-voltage negative feedback is supplied from the output transformer 6 included in the emitter circuit of the transistor 2 through an impedance 9 mainly behaving like an ohmic resistor connected in series with a separation capacitor to the emitter of the transistor 1, as a result of which the desired reduction of the distortion of the amplifier is obtained.

The winding 10 of the input transformer 5 is connected to the base of the transistor 1 so that the signal is passed on from the cable 3, through the transistor 1, any further amplifier stages and finally through the transistor 2 in the amplified state to the cable 4. The series-combination of an inductor 11 and a resistor 12 is connected in parallel with this winding 10. This resistor 12 is proportioned so that at low frequencies at which the inductor 11 constitutes a negligible impedance it provides the required terminal impedance for the cable 3. The input admittance of the transistor has become very high by the negative feedback and is therefore practically negligible. As set out in the foregoing, in the absence of the inductor 11 the resistor 12 would provide an undesirable contribution to the noise for high frequencies.

The input transformer 5 further comprises an additional winding 13 having a smaller number of turns than that of the winding 10 so that across this winding a lower signal voltage is produced than across the winding 10. This winding 13, which may be integral with the winding 10, is connected through the series combination of a resistor 14 and a capacitor 15 to the emitter of the transistor 1. The capacitor 15 constitutes a high impedance for low frequencies so that this branch substantially does not pass signals. On the contrary, for higher frequencies the inductor 11 assumes such a high impedance value that a negligible signal current flows in the branch 11, 12. The capacitor 15 is proportioned so that it then constitutes a low impedance for signal currents so that the negative feedback becomes operative from the emitter of the transistor 1 through the circuit 14, 15 to the winding 13. The terminal resistance for the cable 3 is then mainly constituted by the value of the resistor 14 which can be chosen lower than that of the resistor 12 in a ratio approximately equal to the transformation ratio between the windings 10 and 13. Consequently, the undesired contribution to the noise by the resistor 12 for the high frequencies is avoided while nevertheless at the same time the correct cable adaptation is retained.

The time constant of the series-combination 11, 12 is chosen approximately equal to the time constant of the series-combination 14, 15. These series-combinations therefore constitute inverse networks having a common practically frequency-independent impedance in parallel with the transformer 5. In practice, it has been found to be desirable, also with a view to the structure of the equalization impedance 8, which for high frequencies acts like a series-LC-circuit shunted by a resistor, that the inductor 11 should be shunted by a capacitor 17 and that an inductor 18 should be connected in series with the circuit 14, 15. The resonance frequency of the branch 11, 17 and that of the branch 15, 18 are chosen to be substantially equal, i.e. just above the end—the limit frequency—of the signal band to be processed by the amplifier.

What is claimed is:

1. An amplifier comprising an amplifier device having first and second input electrodes and an output electrode, as source of signals, input transformer means connected to said source of signals, said input transformer means comprising winding means connected to said first input electrode, first impedance means connected in shunt which said winding means, and second impedance means serially connected between said winding means and said second input electrode, said first impedance means comprising a series circuit of a first resistor and an inductor, said second impedance means comprising a series circuit of a second resistor and a capacitor, whereby for a first range of signal input frequencies and first resistor determines the input impedance of said amplifier and for a second higher range of signal input frequencies said second resistor determines the input impedance of said amplifier.

2. An amplifier comprising an amplifier device having first input, second input and output electrodes, frequency dependent negative feedback means connected between said second input electrode and a point of reference potential, a source of signals, input transformer means connected to said source of signals, said transformer means having winding means connected between said first input electrode and said point, first resistor means and inductor means serially connected between said first input electrode and said point whereby for a first frequency range of input signals said first resistor means determines the input impedance of said amplifier, a series circuit of second resistor means and capacitor means connected between said winding means and said second input electrode whereby for a second higher frequency range of input signals said second resistor means determines the input impedance of said amplifier.

3. The amplifier of claim 2 in which said winding means comprises a first winding inductively coupled to said source and connected between said first input electrode and said point, and a second winding inductively coupled to said source and connected between said series circuit and said point.

4. The amplifier of claim 2 comprising a capacitor connected in shunt with said inductor to form a first resonant circuit and an inductor connected in series with said first mentioned capacitor to form a second resonant circuit, the resonant frequencies of said first and second resonant circuits being substantially equal and higher than the highest signal frequency to be amplified in said amplifier.

No references cited.

JOHN KOMINSKI, *Primary Examiner.*

U.S. Cl. X.R.

330—31, 32, 89, 186, 189